US006419729B1

(12) United States Patent
Duffy et al.

(10) Patent No.: US 6,419,729 B1
(45) Date of Patent: Jul. 16, 2002

(54) FILTER ASSEMBLIES WITH ADHESIVE ATTACHMENT SYSTEMS

(75) Inventors: Dean R. Duffy, Woodbury, MN (US); William M. Stevenson, Somerset, WI (US); John F. Reed, North Oaks; David J. Andrews, Rosemont, both of MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/550,869

(22) Filed: Apr. 17, 2000

(51) Int. Cl.[7] ................................................. B03C 3/30
(52) U.S. Cl. ........................... 96/17; 55/385.6; 55/501; 55/524; 55/528; 55/DIG. 35; 55/DIG. 39; 96/66; 96/68; 96/98
(58) Field of Search ..................... 55/495, 501, 524, 55/528, 385.6, DIG. 39, DIG. 35, DIG. 31, DIG. 5; 96/17, 69, 98, 99, 66, 68; 95/59

(56) References Cited

U.S. PATENT DOCUMENTS

| | | | |
|---|---|---|---|
| 2,736,721 A | 2/1956 | Dexter | 525/475 |
| RE24,906 E | 12/1960 | Ulrich | 428/480 X |
| 3,675,403 A * | 7/1972 | Ruffo | 55/524 |
| 3,815,341 A | 6/1974 | Hamano | 55/528 X |
| 3,971,373 A | 7/1976 | Braun | 428/328 X |
| RE30,782 E | 10/1981 | van Turnhout | 264/DIG. 48 |
| 4,340,402 A * | 7/1982 | Catron | 55/528 X |
| RE31,285 E | 6/1983 | van Turnhout et al. | 55/DIG. 39 |
| 4,429,001 A | 1/1984 | Kolpin et al. | 428/338 X |
| 4,478,620 A * | 10/1984 | Tamura | 55/524 X |

(List continued on next page.)

FOREIGN PATENT DOCUMENTS

| | | |
|---|---|---|
| JP | 01018414 | 1/1989 |
| JP | 0 462 369 A1 | 12/1991 |
| JP | 06178905 | 6/1994 |
| WO | WO 95/05501 | 2/1995 |
| WO | WO 99/58224 | 11/1999 |

OTHER PUBLICATIONS

ASTM D 6252, "Standard Test Method for Peel Adhesion of Pressure–Sensitive Label Stocks at a 90° Angle," *Annual Book of ASTM Standards*, vol. 15.09, pp. 927–929 (1999).

ASTM D 737–96, "Standard Test Method for Air Permeability of Textile Fabrics," *Annual Book of ASTM Standards*, vol. 07.01, pp. 231–235 (1997).

Society of Automotive Engineers, "Passenger Compartment Air Filter Test Code—SAE J1669 DEC94, SAE Recommended Practice," 9 pages (1994).

Wente et al., "Manufacture of Superfine Organic Fibers," Report No. 4364 of the Naval Research Laboratories, Washington, DC, Title page, publication page, abstract, table of contents, and pp. 1–15 (1994).

Wente, "Superfine Thermoplastic Fibers," *Industrial Engineering Chemistry*, 48:1342–1346 (1956).

*Primary Examiner*—Richard L. Chiesa
(74) *Attorney, Agent, or Firm*—Gary L. Griswold; Robert W. Sprague; William J. Bond (57) ABSTRACT

Filter assemblies with adhesive attachment systems are provided. In one embodiment, a filter assembly includes a porous filter member and an adhesive disposed on a reinforcement scrim adhesively attached to at least a portion of at least one major surface of the porous filter member, wherein the reinforcement scrim has discrete open areas. In an alternative embodiment, a filter assembly includes a porous filter member that includes fibrous filter media and an adhesive impregnated into discrete regions of the porous filter member such that there is a substantially continuous adhesive region throughout at least about 25% of the thickness of the porous filter member in the discrete regions.

29 Claims, 3 Drawing Sheets

U.S. PATENT DOCUMENTS

| | | | | |
|---|---|---|---|---|
| 4,514,302 A | * | 4/1985 | van Zon et al. | 55/501 X |
| 4,689,058 A | * | 8/1987 | Vogt et al. | 55/524 X |
| 4,798,850 A | | 1/1989 | Brown | 210/500.23 X |
| 5,209,971 A | | 5/1993 | Babu et al. | 428/352 X |
| 5,214,119 A | | 5/1993 | Leir et al. | 528/28 |
| 5,411,576 A | * | 5/1995 | Jones et al. | 55/DIG. 39 |
| 5,421,862 A | * | 6/1995 | Davis | 55/501 X |
| 5,470,485 A | | 11/1995 | Morweiser et al. | 95/273 X |
| 5,495,507 A | | 2/1996 | Bellanger | 375/350 |
| 5,681,630 A | * | 10/1997 | Smick et al. | 55/524 X |
| 5,776,218 A | * | 7/1998 | Enns | 55/DIG. 35 |
| 5,827,340 A | * | 10/1998 | Fiske | 55/385.6 |
| 5,912,369 A | | 6/1999 | Reeves | 55/528 X |
| 6,171,354 B1 | * | 1/2001 | Johnson | 55/DIG. 35 |

* cited by examiner

FILTER ASSEMBLIES WITH ADHESIVE ATTACHMENT SYSTEMS

BACKGROUND

Many types of devices are used to provide filtered air by removing unwanted particles from the surrounding environment. For example, air purifiers, and central heating, ventilation and air-conditioning (HVAC) systems can be used to provide filtered air in a home environment. Many devices require filtered air to protect internal components from abrasion and/or corrosion due to the intake of foreign particles. For example, computers, and industrial equipment enclosures and control panels require filtered air to protect internal components.

A conventional air filter is typically mounted in a frame for easy insertion of the filter into (or onto) a filter housing of a device that circulates air through the air filter. The designs of the frames and housings typically involve mechanical means for holding the filter in place. Frames typically are made of molded polymer or folded cardboard. Housings typically include clamps, friction fit, snap fit, sliding mount, elastic straps, etc. The size of these frame/filter assemblies is not easily modified by the consumer. Thus, it is difficult to customize the filter member and a large inventory is required for different sizes. Therefore, there exists a need for a filter that is easily customized. Also, there exists a need for an inexpensive, bulk filter media that is readily adaptable to a wide range of applications simply by cutting to shape by the consumer.

A filter can also be adhesively mounted. Such mounting means have included double-coated tapes, for example, which have been used around the periphery of a filter. Effective anchoring of a filter with a peripheral adhesive attachment means typically requires that the filter be precut to the shape required by the target appliance so that the adhesive contacts a suitable anchoring site on the appliance. Unfortunately, these adhesive mounting means do not provide advantage for a wide variety of applications, nor are they easy to use for a wide variety of applications. Also, U.S. Pat. No. 5,912,369 (Reeves) discloses the use of a layer of an adhesive coating on one entire face of a fibrous air filter member. This approach requires the coating weight of the adhesive to be carefully controlled so as to minimize the air flow pressure drop while achieving the desired adhesive strength. U.S. Pat. No. 5,912,369 (Reeves) also discloses a spray-coated adhesive was vacuumed into the fibrous interstices of the filter material, and a second light spray-coated adhesive was then applied to the filter material, the two adhesive coatings acting together to retain the filter material onto a target surface (i.e. an appliance housing). Such spray application would typically not provide a substantially continuous adhesive-rich region in the fibrous filter media because a spray-coated adhesive typically produces only a thin adhesive, typically discontinuous coating on individual fibers.

A number of disadvantages exist with conventional adhesively mounted filters. For example, for those assemblies with adhesive on an entire face of the filter member, the filtration effectiveness may be unsuitable for many applications due to the resulting high pressure drop of the filter. For those assemblies with adhesive at the periphery of a filter, exact placement of the filter is not very easy and improper placement can result in poor adhesion or anchoring to the appliance. Also, if an aggressive adhesive is used or if filter media integrity is not sufficiently strong, filter removal can be difficult, often times resulting in adhesive and/or filter member residue being left on the target surface.

SUMMARY

The present invention provides filter assemblies with adhesive attachment systems. The adhesive attachment system is more versatile (for both the filter manufacturer and the consumer) than conventional systems and provides a greater ability to reduce, and preferably eliminate, residue on the device upon removal of the filter assembly.

In one embodiment, a filter assembly includes a porous filter member and an adhesive disposed on a reinforcement scrim adhesively attached to at least a portion of at least one major surface of the porous filter member, wherein the reinforcement scrim has discrete open areas.

In an alternative embodiment, a filter assembly includes a porous filter member that includes a fibrous filter member and an adhesive impregnated into discrete areas of the porous filter member such that there is a substantially continuous adhesive region throughout at least about 25% of the thickness of the porous filter member in the discrete regions.

For the embodiment with the reinforcement scrim, the discrete open areas of the scrim preferably have an average effective circular diameter of at least about 300 microns. It can be formed from a variety of materials, preferably it is formed from a thermoplastic polymer, such as a polyolefin (e.g., a polypropylene polymer). As used herein, a polymer includes within its scope homopolymer and copolymer, and copolymer refers to polymers prepared from two or more different monomers (e.g., terpolymer, tetrapolymer). Also, as used herein, "a" or "an" refers to one or more, thereby encompassing more than one element, whether it be a layer, a fiber, a polymer, etc., in a construction.

The scrim can be adhesively attached to the entire surface of at least one major surface of the porous filter member, or it can be adhesively attached to discrete regions, such as the periphery, of at least one major surface of the porous filter member.

The filter member can include a fibrous nonwoven web, a foam, or a porous membrane. Typically, a fibrous nonwoven web is used. It preferably includes electret fibers, which may be split fibers, spunbond fibers, tribocharged fibers, melt blown fibers, etc. The filter member can also include additional components, such as absorptive or adsorptive particles.

The adhesive is preferably a pressure sensitive adhesive, such as a (meth)acrylic-based adhesive, a poly(alpha-olefin)-based adhesive, a synthetic rubber-based adhesive, or a silicone-based adhesive.

BRIEF DESCRIPTION OF THE DRAWINGS

FIG. 5 is a schematic illustration of a filter assembly cross-section of the present invention wherein the adhesive has been impregnated into the porous filter member: (a) substantially completely throughout the thickness of the filter member; or (b) partially throughout the thickness of the filter member.

DETAILED DESCRIPTION OF PREFERRED EMBODIMENTS

The present invention provides filter assemblies with an adhesive attachment system adhered to a filter member. There are several embodiments of the adhesive attachment system, all of which provide adhesive in a discontinuous layer on the filter member. For certain embodiments, the adhesive is placed directly on the filter member in discrete regions such that it penetrates the surface of the filter member resulting in a fiber-reinforced adhesive region in the discrete regions. For certain other embodiments, the adhesive is placed on a scrim that is adhesively attached to the filter member. The scrim is advantageous because it allows for the use of lighter weight (lower strength) filter media. Also, the scrim allows a wide range of filter media types to be used (different materials, thicknesses, densities/solidities, fiber sizes, weights, etc.)

Preferably, the filter assemblies of the present invention provide a greater ability to reduce, and preferably eliminate, residue on the device upon removal of the filter assembly. Significantly, the filter assemblies of the present invention are more versatile than conventional systems. A filter assembly can be provided in a wide variety of preformed and precut forms, or it can be provided in a sheet material, or as a roll good, that can be cut to the desired size and shape to fit the device by the consumer.

In one embodiment of the present invention, a scrim is used that is coated with an adhesive and adhesively attached to filter media. See FIGS. 1–3, which show scrims 10, 20, and 30 having fibers or filaments 12 in various arrangements, and openings 14 in various shapes and sizes. The adhesive is applied to a scrim, which typically occurs by coating, and subsequently the adhesive-coated scrim is applied to the filter media. The filter media may or may not be attached to another scrim for reinforcement. Thus, for this embodiment, the assembly includes a reinforcing scrim with adhesive coated thereon and a filter member, which includes the filter media and optionally a scrim that may or may not be of the same material as the adhesive-coated scrim (as well as other optional additives, such as adsorptive or absorptive particles).

Figure 2:
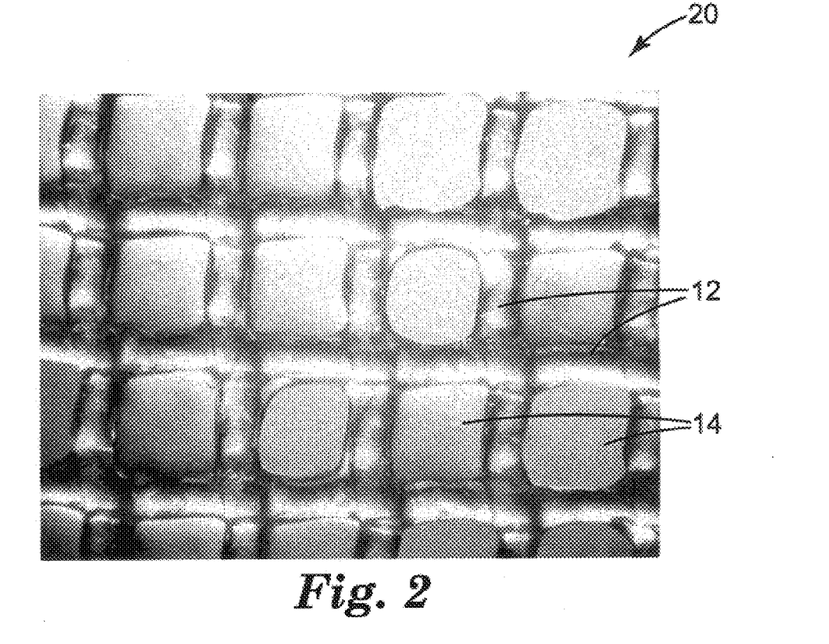
FIG. 2 is a micrograph of an adhesive coated netting that illustrates excessive adhesive bridging. This figure shows twelve cells of the netting of which ten are occluded with a film of adhesive that produces an undesirably high pressure drop.
Figure 3:
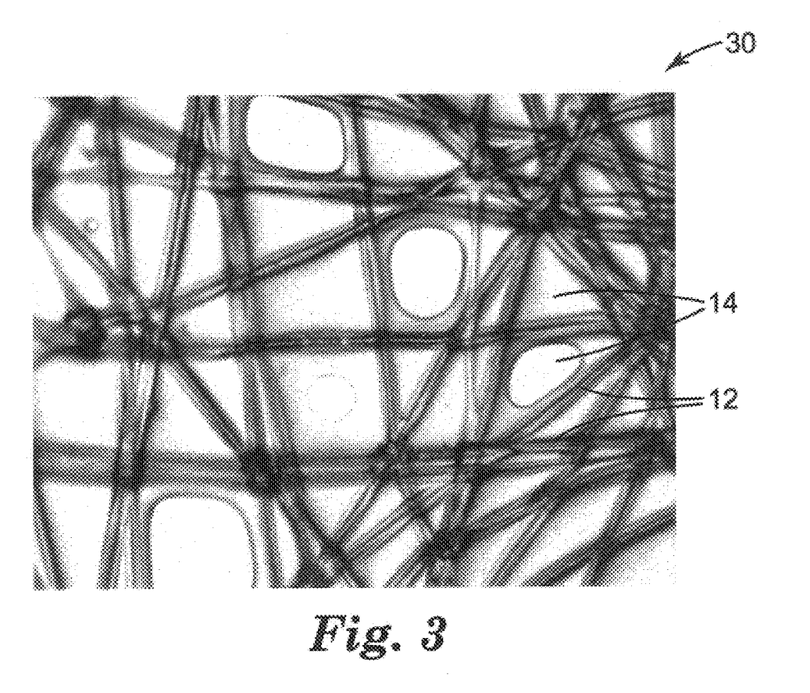
FIG. 3 is a micrograph of an adhesive coated spunbond nonwoven web unsuitable for the present invention that illustrates excessive adhesive bridging between fibers of the web that in turn produces an undesirably high pressure drop.

In this embodiment, the pore size (i.e., open area) of the scrim is important. As can be seen in FIGS. 2 and 3, if the pore size of the openings 14 is too small, excessive adhesive bridging can result. Such excessive adhesive bridging can result in unacceptably high pressure drops (high air flow resistance) for the filter assembly.

In another embodiment of the present invention, the adhesive can be applied to discrete regions of the filter member without the need for a scrim as a carrier for the adhesive, although a scrim can be present if desired. Rather, in this embodiment, the adhesive is impregnated into the filter media. The adhesive can be applied in a wide variety of patterns including dots or discontinuous or continuous stripes. The reduction in active filter area (i.e. the area of the filter effecting contaminant removal) resulting from the stripes or dots is carefully designed so as to not produce too high a pressure drop in the final filter construction. Typically, no more than about 25%, and preferably no more than about 10%, of the active area of a filter member is covered by the adhesive.

Figure 5A:
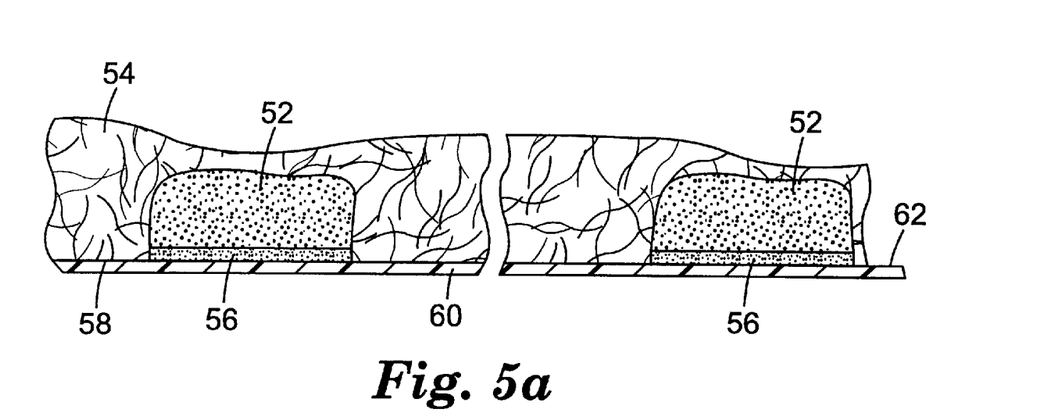
Figure 5B:
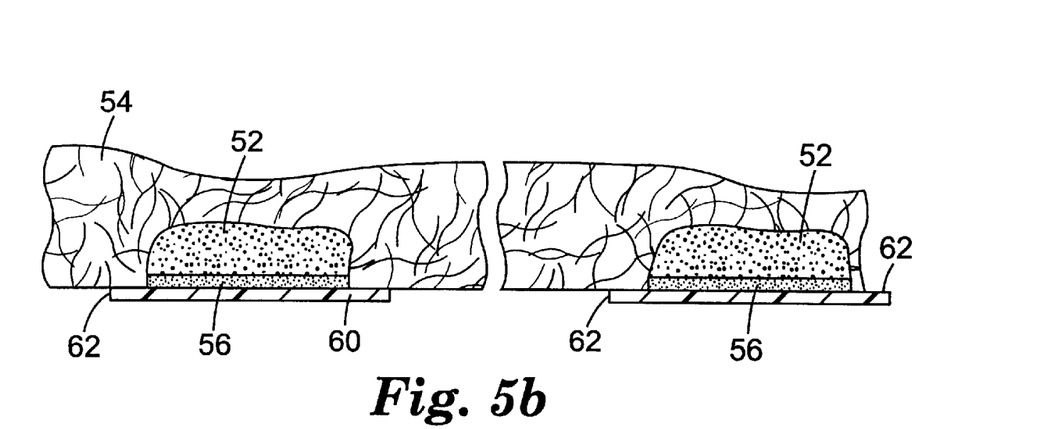

In this embodiment, the adhesive is typically applied to the surface of the filter member in discrete regions and then caused to penetrate into the filter member such that there is a substantially continuous adhesive region throughout at least about 25% (preferably, at least about 50%) of the thickness of the fibrous filter member in the discrete regions. This can be accomplished using a variety of techniques. Typically, a liner or film is placed directly onto the adhesive with concurrent application of pressure, causing the adhesive to penetrate into the filter member. Referring to FIGS. 5a and 5b (which are discussed in greater detail below), this penetration results in a fiber-reinforced adhesive region (i.e., zone) 52 and an adhesive-rich region 56 between the fiber-reinforced region 52 and the liner 60. The adhesive-rich region is typically very thin (e.g., about 0.02–0.2 mm).

The fiber-reinforced adhesive region provides advantage in that it improves the strength of the adhesive and filter member and enhances clean removability of the filter assembly from a surface of a device. The adhesive-rich region provides advantage in that it improves the wetting of the adhesive onto a substrate and increases the peel and shear adhesion of the filter assembly.

If the fiber-reinforced adhesive region is applied to the edge of the filter member, the edge region can be consolidated, which improves appearance and allows easier removal of the filter assembly. The adhesive can also penetrate several layers of filter media thereby bonding the layers together in discrete regions to effectively hold the multi-layer construction together for further processing or end-use.

A release liner can be used, as discussed above, to cause the adhesive to penetrate into the filter member. It can be cut to provide coverage for only the adhesive-rich regions, thereby resulting in significant cost savings. If the liner is cut to extend beyond the adhesive-rich region, it creates a finger-lift tab area that allows for easy removal of the liner from the assembly. For further discussion of this see the discussion of FIGS. 5a and 5b below.

The filter assemblies of the present invention can be used to filter the intake air for air conditioners, dehumidifiers, and computers, as well as on room air cleaners, refrigerators, vents on HVAC systems, box fans, clean room devices, industrial equipment enclosures and control panels, vacuum cleaner post filters, and small electrical devices such as copy machines and printers. They can be used as high efficiency particulate air (HEPA) prefilters and respirator prefilters. Although the filter assemblies are particularly useful for filtering air, they are envisioned to also be useful in other applications which require fluid (air or liquid) flow with minimal pressure drop increase.

Filter Member

The filter member can include a wide variety of types of porous filter media conventionally used in filtration products, particularly air filtration products. The filter media can be a fibrous material, a foam, a porous membrane, and the like. Preferably, it is a fibrous material. Typically, the filter media is a fibrous filter web such as a nonwoven fibrous web, although woven and knitted webs can be used.

For the preferred fibrous materials, the fiber size is preferably less than about 500 microns in diameter, and more preferably less than about 100 microns. A wide variety of basis weights can be used in the filter media. For those embodiments in which a scrim is used, filter media having low basis weights can be used as the scrim adds strength and integrity to the filter assembly. The basis weight of the filter media is preferably about 5 g/m² to about 1000 g/m², and more preferably about 20 g/m² to about 200 g/m². If desired, the filter media can include one or more layers (webs) of filter media.

The filter media can be made of a wide variety of organic polymeric materials, including mixtures and blends. Suitable filter media includes a wide range of materials commercially available. They include polyolefins, such as polypropylene, linear low density polyethylene, poly-1-butene, poly(4-methyl-1-pentene), polytetrafluoroethylene, polytrifluorochloroethylene; or polyvinylchloride; aromatic polyarenes, such as polystyrene; polycarbonates; polyesters; and combinations thereof (including blends or copolymers). Preferred materials include polyolefins free of branched alkyl radicals and copolymers thereof Particularly preferred materials include thermoplastic fiber formers (e.g., polyolefins such as polyethylene, polypropylene, copolymers thereof, etc.). Other suitable materials include: thermoplastic polymers such as polylactic acid (PLA); non-thermoplastic fibers such as cellulose, rayon, acrylic, and modified acrylic (halogen modified acrylic); polyamide or polyimide fibers such as those available under the tradenames NOMEX and KEVLAR from DuPont; and fiber blends of different polymers useful for tribocharging (as described in International Publication No. WO 9958224 (Texel), and U.S. Pat. No. 5,470,485 (Morweiser et al.) and U.S. Pat. No. 4,798,850 (Brown)).

The nonwoven filter media can be formed in a web by conventional nonwoven techniques including melt blowing, spunbonding, carding, air laying (dry laying), wet laying, or the like. Preferably the web is not highly consolidated (e.g., by hydroentanglement, heat or thermomechanical bonding, or the like) so that the solidity is preferably less than about 50% (50% void), more preferably less than about 25%, and most preferably about 2% to about 20%. Percent solidity is defined by the formula:

Solidity=(density of filter media)/(density of polymer)×100.

The nonwoven filter media can be a spunbond or melt blown nonwoven web. Melt blown nonwoven webs can be formed by the process taught in Wente, Van A., "Superfine Thermoplastic Fibers" in Industrial Engineering Chemistry, volume 48, pages 1342 et seq., (1956), or Report No. 4364 of the Naval Research Laboratories, published May 25, 1954, entitled "Manufacture of Superfine Organic Fibers" by Wente, Van A., Boone, C. D. and Feluharty, E. L., which fibers are collected in a random fashion, such as on a perforated screen cylinder or directly onto a support web.

If desired, the fibers or webs can be charged by known methods, e.g., by use of corona discharge electrodes, by high-intensity electric fields, by tribocharging (as described in U.S. Pat. No. 4,798,850), or by hydrocharging (as described in International Publication No. WO 9505501 (Bellanger) and U.S. Pat. No. 5,495,507 (Angadjivand et.al.). The fibers can be charged during fiber formation, prior to or while forming the fibers into the filter web or subsequent to forming the filter web. The fibers forming the filter web can even be charged subsequent to being joined to the scrim support layer.

Charged split film fibers are preferably formed by the method described in U.S. Pat. Reissue No. 30,782 (van Turnhout) and U.S. Pat. Reissue No. 31,285 (van Turnhout et al.). The fibers, as such, are formed from an electrostatically charged (e.g., by a corona discharge electrode) film that has been subsequently fibrillated to provide fibers with a substantially rectangular cross-section. Nonwoven webs of such fibers exhibit high particle capture efficiencies with low resistance to flow.

The fibers can also be coated with a polymer "binder" and/or contain additives to improve electret performance (e.g., fluorochemicals to improve oily aerosol resistance).

The filter media should be capable of exhibiting the ability to capture particulate contaminants that might be potentially harmful to or detrimentally impact on the performance of the appliance protected by the filter. Additionally, the filter media should have a reasonable service life (i.e., it should be capable of removing particulate contaminants over a reasonable time frame without blinding or plugging). For adhesive stripe or dot coated filter member embodiments, the filter member preferably has sufficient strength that it can be readily removed from the appliance without leaving adhesive and/or fibrous residue of the filter member on the appliance.

The filter member can also include additive particles or fibers which can be incorporated in known manners such as disclosed in U.S. Pat. No. 3,971,373 (Braun) or U.S. Pat. No. 4,429,001 (Kolpin et al.). For example, if odor removal is desired, sorbent particulates and fibers could be included in the filter member.

The air flow pressure drop (air permeability) of the filter member can vary and depends on the material chosen for a desired application. An unsuitable air pressure drop for one application may be suitable for another. The efficiency depends on the application, but it is generally desired to have electret enhancement for particulate air filtration applications.

Scrim

The scrim is an open material having a relatively large number of discrete open areas or pores, which pass through the scrim from one face to the opposite face. Suitable scrims include a wide variety of reinforcement scrims, which can be woven or nonwoven.

The scrim material can be formed of any suitable material such as an organic polymer, fiberglass, ductile metal, or the like. Suitable organic polymeric materials include polyethylene, polypropylene, polyethylene terephthalate (polyester), ethylene vinyl acetate, nylon, and combinations thereof (including blends and copolymers). Also, coextruded structures and coated netting could be useful. Preferably, the scrim is formed of thermoplastic fibers material such as the cross-laminated polyethylene slit-film fibers sold under the trade name CLAF by ANCI (Amoco Nisseki CLAF, Inc).

Other cross-laminated fibrous scrims could also be used, with the lamination done by conventional techniques such as heat, thermomechanical or adhesive coating of the fibrous cross-laminated structure. Other processes useful to form suitable scrims include extruded netting, extruded/oriented netting, perforated films, expanded films, and perforated nonwovens.

Preferably, the scrim has discrete open areas with an average cross-sectional area of at least about 0.5 mm², and more preferably at least about 1.0 mm². The scrim open area can also be described in terms of an Effective Circular Diameter (ECD) which is the diameter of the largest circle that can fit into an individual discrete open area. The average ECD is generally at least about 300 microns, preferably at least about 500 microns.

Preferably, the open areas have a non-tortuous path through the scrim, and more preferably the open areas extend directly from one face to the opposite face (e.g., as a column).

For certain embodiments, such as those that have high air flow applications, the overall pressure drop of the scrim material should be relatively small, generally less than about 1.5 mm $H_2O$, preferably less than about 1.0 mm $H_2O$, and most preferably less than about 0.5 mm $H_2O$ at a gaseous face velocity of 2 meters/second at ambient conditions. For certain other embodiments, such as those that have low air flow applications, a much higher pressure drop can be tolerated, often as high as 10 mm or 20 mm $H_2O$.

If desired, the scrim can be treated with corona discharge or other surface treatments or primers to enhance adhesion of the adhesive to the scrim.

Adhesive

Suitable adhesives useful in the present invention include pressure-sensitive adhesives. Pressure-sensitive adhesives useful in the present invention include tackified natural rubbers, synthetic rubbers, tackified styrene block copolymers, (meth)acrylics, poly(alpha-olefins), and silicones. Preferably, the adhesive is oxidatively stable (i.e., maintains adhesion over time) and exhibits low adhesion build over time.

Useful natural rubber pressure-sensitive adhesives generally contain masticated natural rubber, from 25 parts to 300 parts of one or more tackifying resins to 100 parts of natural rubber, and typically from 0.5 part to 2.0 parts of one or more antioxidants. Natural rubber may range in grade from a light pale crepe grade to a darker ribbed smoked sheet and includes such examples as CV-60, a controlled viscosity rubber grade and SMR-5, a ribbed smoked sheet rubber grade. Tackifying resins used with natural rubbers generally include but are not limited to wood rosin and its hydrogenated derivatives; terpene resins of various softening points, and petroleum-based resins. Other materials can be added to natural rubber adhesives for special purposes, wherein the additions can include plasticizers, pigments, and curing agents to partially vulcanize the pressure-sensitive adhesive.

Another useful class of pressure-sensitive adhesives are those that include synthetic rubber. Such adhesives are generally rubbery elastomers, which are either self-tacky or non-tacky and require tackifiers.

Self-tacky synthetic rubber pressure-sensitive adhesives include for example, butyl rubber, a copolymer of isobutylene with less than 3 percent isoprene, polyisobutylene, a homopolymer of isoprene, polybutadiene, or styrene/butadiene rubber.

Synthetic rubber pressure-sensitive adhesives, which generally require tackifiers, are also generally easier to melt process. They include polybutadiene or styrene/butadiene rubber, from 10 parts to 200 parts of a tackifier, and generally from 0.5 part to 2.0 parts per 100 parts rubber of an antioxidant. An example of a synthetic rubber is that available from BF Goodrich under the trade name AMERIPOL 1011A, a styrene/butadiene rubber. Tackifiers that are useful include derivatives of rosins, polyterpenes, $C_5$ aliphatic olefin-derived resins, and $C_9$ aromatic/aliphatic olefin-derived resins.

Styrene block copolymer pressure-sensitive adhesives generally include elastomers of the A-B or A-B-A type, where A represents a thermoplastic polystyrene block and B represents a rubbery block of polyisoprene, polybutadiene, or poly(ethylene/butylene), and resins. Examples of the various block copolymers useful in block copolymer pressure-sensitive adhesives include linear, radial, star and tapered styrene-isoprene block copolymers such as those available under the trade names KRATON D 1107P, KRATON G1657, KRATON G 1750X, and KRATON D 1118X from Shell Chemical Co. The polystyrene blocks tend to form domains in the shape of spheroids, cylinders, or plates that causes the block copolymer pressure-sensitive adhesives to have two phase structures. Resins that associate with the rubber phase generally develop tack in the pressure-sensitive adhesive. Examples of rubber phase associating resins include aliphatic olefin-derived resins, such as those available under the trade names ESCOREZ 1300 and WINGTACK from Goodyear; rosin esters, such as those available under the trade names FORAL and STAYBELITE Ester 10 from Hercules, Inc.; hydrogenated hydrocarbons, such as those available under the trade name ESCOREZ 5000 from Exxon; polyterpenes, such as those available under the trade name PICCOLYTE A; and terpene phenolic resins derived from petroleum or terpentine sources, such as those available under the trade name PICCOFYN A100 from Hercules, Inc. Resins that associate with the thermoplastic phase tend to stiffen the pressure-sensitive adhesive.

(Meth)acrylic pressure-sensitive adhesives generally have a glass transition temperature of about −20° C. or less and may include from 100 to 80 weight percent of a $C_3$–$C_{12}$ alkyl ester component such as, for example, isooctyl acrylate, 2-ethyl-hexyl acrylate and n-butyl acrylate and from 0 to 20 weight percent of a polar component such as, for example, acrylic acid, methacrylic acid, ethylene vinyl acetate, N-vinyl pyrrolidone and styrene macromer. Preferably, the (meth)acrylic pressure-sensitive adhesives include from 0 to 20 weight percent of acrylic acid and from 100 to 80 weight percent of isooctyl acrylate. The (meth)acrylic pressure-sensitive adhesives may be self-tacky or tackified. Useful tackifiers for (meth)acrylics are rosin esters such as that available under the trade name FORAL 85 from Hercules, Inc., aromatic resins such as that available under the trade name PICCOTEX LC-55WK from Hercules, Inc., aliphatic resins such as that available under the trade name PICCOTAC 95 from Hercules, Inc., and terpene resins such as that available under the trade names PICCOLYTE A-115 and ZONAREZ B-100 from Arizona Chemical Co. Other materials can be added for special purposes, including hydrogenated butyl rubber, pigments, and curing agents to vulcanize the adhesive partially.

Poly(alpha-olefin) pressure-sensitive adhesives, also called a poly(1-alkene) pressure-sensitive adhesives, generally include either a substantially uncross-linked polymer or a uncross-linked polymer that may have radiation activatable functional groups grafted thereon as described in U.S. Pat. No. 5,209,971 (Babu et al.). Poly(alpha olefin) polymers are generally predominantly amorphous and include, for example, $C_3$–$C_{18}$ 1-alkene polymers, preferably $C_3$–$C_{12}$ 1-alkenes and copolymers with $C_3$ and more preferable $C_6$–$C_8$ and copolymers of those with $C_3$. The poly(alpha-olefin) polymers may be self tacky and/or include one or more tackifying materials.

Suitable tackifying materials for the poly(alpha-olefins) include resins that are miscible in the poly (alpha-olefin) polymer. The total amount of tackifying resin in the poly (alpha-olefin) polymer ranges from 0 to 150 parts by weight per 100 parts of the poly(alpha-olefin) polymer depending on the specific application. Useful tackifying resins include resins derived by polymerization of $C_5$ to $C_9$ unsaturated hydrocarbon monomers, polyterpenes, synthetic polyterpenes and the like. Examples of such commercially available resins based on a $C_5$ olefin fraction of this type include those available under the trade name WINGTACK from Goodyear Tire and Rubber Co. Other materials can be added for special purposes, including antioxidants, fillers, pigments, and radiation activated cross-linking agents.

Silicone pressure-sensitive adhesives include two major components, a polymer or gum, and a tackifying resin. The polymer is typically a high molecular weight polydimethylsiloxane or polydimethyldiphenylsiloxane, that contains residual silanol functionality (SiOH) on the ends of the polymer chain, or a block copolymer including polydiorganosiloxane soft segments and urea terminated hard segments. The tackifying resin is generally a three-dimensional silicate structure that is endcapped with trimethylsiloxy groups ($OSiMe_3$) and also contains some residual silanol functionality. Examples of tackifying resins include SR 545, from General Electric Co., Silicone Resins Division, Waterford, N.Y., and MQD-32-2 from Shin-Etsu Silicones of America, Inc., Torrance, Calif.

Manufacture of typical silicone pressure-sensitive adhesives is described in U.S. Pat. No. 2,736,721 (Dexter). Manufacture of silicone urea block copolymer pressure-sensitive adhesive is described in U.S. Pat. No. 5,214,119 (Leir et al.). Other materials can be added for special purposes, including, pigments, plasticizers, and fillers. Fillers are typically used in amounts from 0 part to 10 parts per 100 parts of silicone pressure-sensitive adhesive. Examples of fillers that can be used include zinc oxide, silica, carbon black, pigments, metal powders, and calcium carbonate.

Properties of the Filter Assemblies

The filter assemblies of the present invention can be used for a broad range of applications through proper selection of the filter media, scrim, and adhesive used in the assemblies. For example, applications requiring low pressure drop might use a more open scrim and a lower basis weight filter media. In an alternative construction, a lower basis weight filter media having widely spaced dot or strip patterns directly applied thereto would provide a suitable filter assembly. Environments that expose equipment to high particulate challenges or require higher particle capture efficiencies, that can also tolerate higher pressure drops, could use a higher basis weight filter media and perhaps a stronger adhesive attachment system. In this case, a more closely spaced adhesive pattern applied directly to the filter member may be desired. In either case, proper selection of the various components of the filter assembly (e.g., filter member, adhesive, adhesive pattern, scrim) facilitates customization of the filter assembly to the application.

The adhesion of the filter assemblies of the present invention to a surface of a device can be controlled through adhesive selection and the area of the adhesive contacting the substrate. Contact area can be controlled by the fiber width/diameter and/or number of fibers in a scrim, or the number, width, and spacing of the adhesive coated regions on the filter member. It is understood that the appropriate balance between air-flow resistance (i.e., pressure drop) for the filter assembly and the desired adhesion to the target substrate must be achieved.

The adhesive strength of the bond between the filter assembly and the removability of the filter assembly can also be balanced through adhesive selection and the amount of fibrous filter media incorporated into the fiber-reinforced adhesive region. The cohesive strength of an adhesive pattern applied directly to the filter member can be improved by the incorporation of filter media fibers into the adhesive. Application of the appropriate pressure to the release liner will control the adhesive penetration into the filter member to achieve the desired cohesive strength while maintaining the appropriate thickness of the adhesive-rich region to achieve the desired adhesion level of the filter assembly to a given surface.

The filter assemblies of the present invention are readily adaptable to virtually any size and shape filter. Filter assemblies having an adhesive coated scrim covering substantially one entire major surface of the assembly or assemblies having closely spaced adhesive patterns will demonstrate good adhesion to substrates independent of the filter size.

Methods of Preparation

Figure 4:
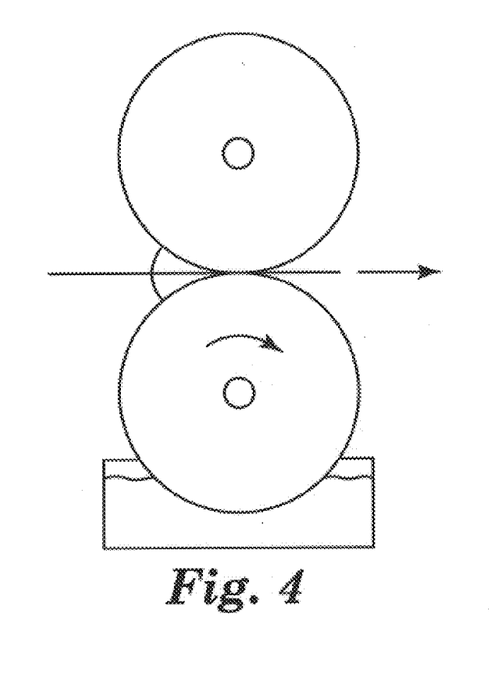
FIG. 4 is a schematic of a typical roll coating apparatus used to apply an adhesive to a supporting scrim of the filter assembly utilized in one embodiment of the present invention.

Typically, for the embodiments that use an adhesive-coated scrim, the adhesive can be applied to a scrim by a variety of methods. For example, FIG. 4 is representative of a roll-coating method in which the adhesive is applied to the scrim. The adhesive-coated scrim is subsequently adhesively attached to the filter member by any typical lamination method, such as calandaring, embossing, etc. The preferred method is to use a low-pressure laminating nip that consists of two rubber rollers.

For other embodiments, the adhesive can be directly coated onto the filter member such that the adhesive penetrates the surface of the filter member to produce a fiber-reinforced adhesive region in the filter member and an adjacent adhesive rich region on the face of the filter member.

Referring to FIGS. 5a and 5b, an adhesive forms a fiber-reinforced adhesive region 52 within filter member 54 and an adjacent adhesive-rich region 56 located substantially on surface 58 of filter member 54. Adhesive-rich region 56 is typically covered with a release liner 60. In FIG. 5a, the fiber-reinforced region 52 penetrates substantially through the thickness of the filter member 54, whereas in FIG. 5b, the fiber-reinforced region 52 penetrates only partially into the thickness of filter member 54. When adhesive regions 52 and 56 are applied to the edge of the filter member 54, they reinforce the edge and cooperate with release liner 60 to form a finger-lift tab 62 that facilitates removal of the release liner from the adhesive on the filter member. In FIG. 5b, release liner 60 is present as narrow strips that extend slightly beyond the width of adhesive-rich region 56 rather than covering the full face of the adhesive coated filter member. The release liner extension also creates a finger-lift tab for adhesive patterns found in the interior region of a filter assembly.

EXAMPLES

This invention is further illustrated by the following examples that are not intended to limit the scope of the invention. In the examples, all parts, ratios and percentages are by weight unless otherwise indicated.

Scrim Materials

A nonlimiting list of scrim materials useful in producing filter assemblies of the present invention is presented in Table 1. Scrims in the form of a net that typically have a regular, rectangular array are described by the filament (strand) spacing. For example, 4×3 designates 4 strands per 2.54 cm (one inch) in the machine direction and 3 strands per 2.54 cm (one inch) in the cross-machine direction.

TABLE 1

| | | Scrim Materials | |
|---|---|---|---|
| ID | Tradename | Description | Product # |
| S-1 | CLAF[1] | Polyethylene cross-laminated scrim | SS1601 |
| S-2 | CLAF[1] | Polyethylene cross-laminated scrim | LS9215 |
| S-3 | CONWED[2] | 4 × 4 extruded PP netting | RO5340 |

TABLE 1-continued

Scrim Materials

| ID | Tradename | Description | Product # |
|---|---|---|---|
| S-4 | THERMANET[2] | 3.5 × 3.5 co-extruded EVA/PP netting | 750012-018 |
| S-5 | CONNECT[3] | 7 × 5 PET filaments | CP0028 |
| S-6 | CONNECT[3] | 4 × 3 PET filaments | CP0009 |
| S-7 | CONNECT[3] | 6 × 4 PET filaments | CP0015 |
| S-8 | REEMAY[4] | PET spunbond | 2004 |
| S-9 | Type Z9[5] | 2.0 oz/yd[2] Nylon spunbond | Z920 |
| S-10 | Type 21[5] | 0.25 oz/yd[2] Nylon spunbond | 212F |
| S-11 | PLASTINET[7] | 16 × 16 PP netting, diamond pattern, 0.022" strand diameter | P2216 |

[1]Available from ANCI (Amoco Nisseki CLAF, Inc. of Roanoke, AL), a joint venture between BP Amoco Chem. and Nippon Petrochem. Co. of Japan.
[2]Extruded netting available from Conwed (Minneapolis, MN).
[3]Cross-laid netting available from Conwed (Minneapolis, MN).
[4]Available from BBA Reemay (Old Hickory, TN).
[5]Available from Cerex Nonwovens (Pensacola, FL).
[6]Available from Applied Extrusion Technologies, Inc. (Middletown, DE).

Adhesive Materials

A representative list of adhesives useful for producing filter assemblies of the present invention is presented in Table 2.

TABLE 2

Adhesive Materials

| ID | Description/Number | Type | % Solids | Viscosity (cps) |
|---|---|---|---|---|
| A-1 | Scotch-Grip 4224-NF[1] | Acrylate | 39–42 | 9,000–12,000 |
| A-2 | IOA/AA[2] | Acrylate | 40.5–44.5 | 450–650 |
| A-3 | PS-2000[3] | Acrylate | 54.6 | 60 |
| A-4 | 9640[4] | Acrylate | 51–53 | 750 |
| A-5 | HM-1597[5] | Synthetic Rubber | 100 | |
| A-6 | Natural Rubber[6] | Natural Rubber | 20 | |

[1]Available from 3M Company (St. Paul, MN).
[2]An acrylate 95/5 IOA/AA copolymer (wt %) prepared substantially as described in US Re24906 (Ulrich).
[3]Acrylate adhesive available from Rohm & Haas (Philadelphia, PA).
[4]Acrylate adhesive available from Union Carbide (Danbury, CT).
[5]Kraton-based synthetic-rubber adhesive available from H. B. Fuller (St. Paul, MN) was obtained in pellet form. The pellets were dissolved in toluene at a ratio of 20 ml solvent to 10 g adhesive.
[6]Natural rubber adhesive including of a blend of 100 grams of natural rubber, 10 grams of zinc oxide, 20 grams of $C_5$ resin (Escorez 1304 - available from ExxonMobil Chemical, Irving, TX), and 520 grams of heptane, that were compounded using standard rubber resin compounding techniques.

Filter member

A non-limiting list of filter member suitable for producing filter assemblies of the present invention is presented in Table 3.

TABLE 3

Filter member

| Tradename | Type | Number |
|---|---|---|
| F-1 COMFORTLOFT[1] | PET airlaid | 610 |
| F-2 CELESTRA[2] | PP spunbond | 050MLP009U |
| F-3 FILTRETE[3] | PP fibrillated film electret | GCB-30 |
| F-4 FILTRETE[4] | PP fibrillated film electret | GCC-30 |
| F-5 T-FLO[5] | PP film fibrillated electret | Roll 0201 |
| F-6 FILTRETE[6] | PP fibrillated film electret | GSB-50 |
| F-7 ELECTROSTAT[7] | PP/modacrylic Tribo-charged electret | EO50/115 |
| F-8 CEREX[8] | Nylon spunbond | Z920 |
| F-9 INTREPID[9] | PE/PP spunbond electret | 2 osy |
| F-10 REEMAY[2] | PET spunbond | 2214 |
| F-11 KIARA[10] | PP/PE nonwoven | 4104U |
| F-12 PREMIERE[9] | air laid cellulose pulp | 3478 |
| F-13 CYCLEAN[9] | PP Meltblown | 0.6 osy |
| F-14 FILTRETE[11] | PP meltblown/spunbond laminate | S-4030 |
| F-15 AQF[12] | Activated carbon/bicomponent fiber | CPS286 |

[1]Available from the Stearns Technical Textile Company (Cincinnati, OH).
[2]Available from BBA Nonwovens (Old Hickory, TN).
[3]FILTRETE GCB-30 is a 30 gram per square meter (g/m$^2$) web of fibrillated polypropylene electret nonwoven web fibers with a scrim on one side (available from 3M Company, St. Paul, MN).
[4]FILTRETE GCC-30 is a 30 gram per square meter (g/m$^2$) web of fibrillated polypropylene electret nonwoven web fibers with a scrim on both sides (available from 3M Company, St. Paul, MN).
[5]Available from TransWeb LLC (Vineland, NJ).
[6]FILTRETE GSB-50 is a 50 gram per square meter (g/m$^2$) web of fibrillated polypropylene electret nonwoven web with a scrim on one side (available from 3M Company, St. Paul, MN).
[7]Available from All Felt Products, Inc. (Newburgh, NY).
[8]Available from Cerex Advanced Fabrics (Pensacola, FL).
[9]Available from Kimberly-Clark Corporation (Roswell, GA).
[10]Available from PGI Nonwovens Chicopee (North Little Rock, AR).
[11]FILTRETE S-4030 is a meltblown/spunbond electret laminate available from 3M Company (St. Paul, MN).
[12]Activated carbon immobilized in a bicomponent polyester nonwoven matrix. Available from AQF Technologies (Charlotte, NC).

Adhesive Coating Processes

Bench-top

A Bench-top coating technique was used to prepare laboratory samples for screening purposes. A 4-mil polyethylene (PE) film was placed on a bench-top, approximately 10 ml of a PSA latex placed on the film, a scrim placed over the adhesive, the scrim covered with another PE film, and the PSA uniformly distributed throughout the scrim by working the laminate with a squeegee. The adhesive coated scrim was either air-dried (room temperature for about one hour) or oven dried in a laboratory oven (70° C. for about 1–5 minutes).

Pattern Coating

Adhesive was coated directly on the filter member using an "ULTRA" automatic fluid dispenser, available from EFD Company (East Providence, R.I.). The adhesive was coated in a variety of different patterns (stripes, dots, etc.). Stripe coatings were prepared by applying parallel adhesive stripes (approximately 1–4 mm width) on the filter member spaced 1–8 cm on centers. Dot coatings were prepared by coating approximately 1–4 mm dots spaced in a rectangular array with the dot centers approximately 15–30 mm apart. Peripheral coatings were prepared by coating one stripe around the periphery of the filter member.

The filter member was placed on a silicone coated release liner (2–44RLS double coated super-calendered kraft paper from DCP-Lohja, Inc., Willowbrook, Ill.), the adhesive patterns coated on the filter member, the adhesive coated filter member covered with a second piece of release liner, and the laminate was rolled two times with a rubber coated roller (approximately 2 kg, 5 cm wide), causing the PSA to penetrate into the filter member. The width (diameter) of the adhesive stripe (dot) increased approximately 2–3X after rolling.

Test Methods

Basis Weight (B.W.)

Web basis weight (for the scrim and filter member) was determined by cutting a 170 mm×170 mm sample of the web, weighing the sample, and calculating the basis weight in grams per square meter (g/m$^2$).

Thickness

Web thickness (for the scrim and filter member) was measured using an Ames 214-10 Thickness Gauge (B.C. Ames Co, Watham, Mass.).

Pressure Drop (ΔP)

Pressure drop (for the scrim and filter member) was determined using SAE test method J1669. The test sample were sized 170 mm×170 mm and were tested on an open area of 160 mm×160 mm. Flow rates were adjusted to obtain face velocities of 1 or 2 meters/second.

Filtration Efficiency

Filtration efficiency as well as pressure drop of the filtration filter member were measured at a face velocity of 1 meter/second using 0.1 micron NaCl aerosol challenge on an 8110 Automated Filter Tester (AFT) available from TSI Company (Minneapolis, Minn.) using the manufacturer's recommended testing procedures.

Frazier Air Permeability

Frazier Permeability of the filter member and scrims was measured on a High Pressure Air Permeability Measuring Instrument from Frazier Instrument Company (Hagerstown, Md.) according to standard test method ASTM D737-96.

Peel Adhesion

Peel adhesion of the adhesive coated scrims was measured on a Model SP-102B-3M90 peel tester from IMASS, Inc. (Accord, Mass.) using 90 degree peel test method ASTM D6252 using steel test panels.

PSA CLAF Adhesion

Nonwoven webs were qualitatively evaluated for their ability to adhere to PSA CLAF. The filter member were rated as having low (L), medium (M), or high (H) ability to adhere to PSA CLAF.

PSA Residue Screening

Adhesive scrims were applied to a polyester film by rolling two times using a 2-kg rubber covered roller. The samples were aged for approximately 24 hours on the polyester film and then removed. Adhesive residue was qualitatively rated as low (L), Medium (M), or high (H) where "Low" showed either no residue or occasional small areas of adhesive residue remaining on the film, "High" showed very large areas of adhesive residue remaining on the film, and "Medium" showed an intermediate level of residue.

Gradience (G)

A ratio in pressure drop between the low pressure drop scrim ($\Delta P_{scrim}$) layer and the higher pressure drop filter member layer ($\Delta p_{media}$) defined by the following equation.

$$G = \frac{\Delta P_{media} - \Delta P_{scrim}}{\Delta P_{total}}$$

Where $\Delta P_{total}$ is the total pressure drop of the filter assembly measured by testing with the scrim placed downstream of the filter member layer.

Example 1

Parallel stripes of pressure sensitive adhesive (A-1) were applied to filter member (F-4) using the strip coating process described above. Stripe width was measured after rolling two times with a rubber-coated roller.

Generally, configurations with wider stripes (e.g., 4 mm wide) or configurations with narrower spacing between stripes produced larger increases in pressure drop. Also, higher adhesion values were realized with configurations having more stripes and/or wider stripes.

Example 2

Pressure sensitive adhesive (A-1) was applied to filter member (F-4, 170 mm×107 mm) in a rectangular dot array, as described in Table 4 below, over the entire surface of the filter member using the Pattern Coating procedure described above.

It was noted that dot coated filter member and stripe coated filter member with similar adhesive coating basis weights gave similar pressure drop increases.

TABLE 4

| | | | | | | | | |
|---|---|---|---|---|---|---|---|---|
| | | | | Adhesive Dot Coating | | | | |
| Number of dots per 170 × 170 mm | Dot diameter after rolling mm | Initial Filter member B.W. g/m$^2$ | Coated B.W. g/m$^2$ | PSA B.W. g/m$^2$ | Filter member ΔP @ 2 m/s mm H$_2$O | Coated Filter member ΔP @ 2 m/s mm H$_2$O | Increase in ΔP % | Average Peel (over two dots) g/25 mm |
| 51 | 10 | 63.3 | 78.9 | 15.7 | 5.7 | 6.9 | 21 | 21 |

Example 3

Filter member having areas of a pressure sensitive adhesive coating were prepared similar to Example 2, except that the adhesive was applied only around the periphery of the filter member. A slight increase in pressure drop was noted with these samples if the PSA coating extended into the flow-field of the filter member in the test fixture. If the adhesive was completely out of the flow-field, no increase in pressure drop was observed.

TABLE 5

Peripheral Adhesive Coating

| Width after rolling mm | Initial B.W. g/m² | Coated B.W. g/m² | PSA B.W. g/m² | Filter member ΔP @ 2 m/s mm H₂O | Coated Filter member ΔP @ 2 m/s mm H₂O | Increase in ΔP % | Average Peel parallel to Stripes g/25 mm |
|---|---|---|---|---|---|---|---|
| 5 | 65.0 | 77.2 | 12.2 | 6.0 | 6.0 | 0 | |
| 10 | 67.5 | 92.6 | 25.1 | 6.4 | 7.1 | 11 | 76.6 |

Example 4

A variety of scrims were coated with adhesive A-2 using the "Bench-Top" coating techniques described above.

Figure 1:
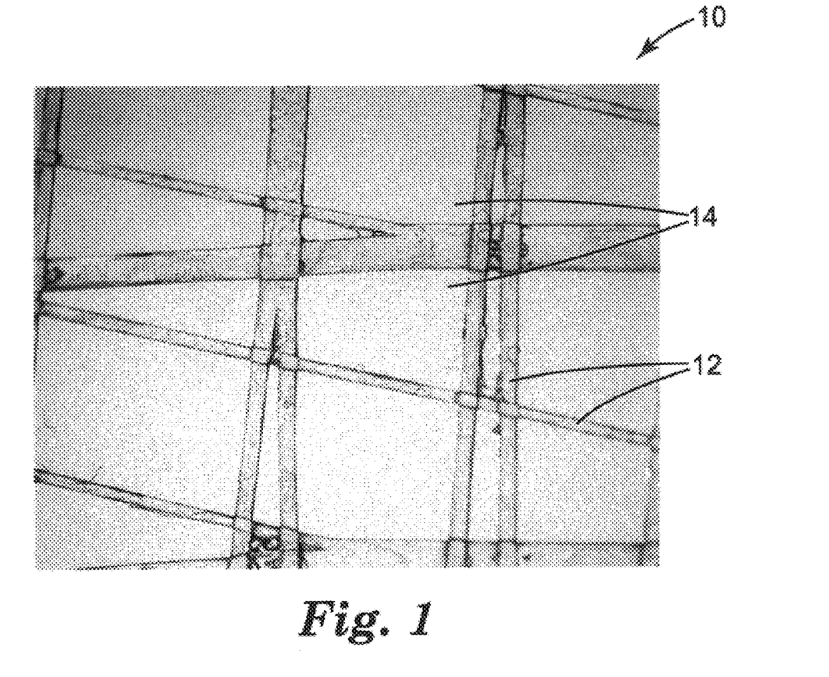
FIG. 1 is a micrograph of a preferred embodiment of an adhesive coated netting utilized in one embodiment of the present invention wherein the adhesive coating is present only on the filaments of the netting.

Best results were seen with an open scrim that had a relatively large cell size. As shown in FIG. 1, the adhesive only coats the polyethylene material area on scrim S-1.

Generally, scrims with larger diameter fibers or strands and smaller cell opening size gave unacceptably high increases in pressure drops due to adhesive bridging. As can be seen in FIG. 2, almost every cell of the scrim has adhesive bridging, leaving only an occasional open cell.

The data also shows that a spunbond having a high Frazier air permeability (S-8–S-10) produced an unacceptably high increase the pressure drop. Adhesive coated spunbond nonwoven scrims typically also gave very low peel values. As can be seen in FIG. 3, these scrims have a smaller cell (or pore) size and much of the adhesive is bridging between the fibers.

TABLE 6

Performance Characteristics of Various Coated Scrims

| Scrim | Initial B.W. g/m² | Coated B.W. g/m² | PSA B.W. g/m² | Initial Frazier cfm | Coated Frazier cfm | Change in Frazier cfm | Scrim ΔP @ 2 m/s mm H₂O | Coated Scrim ΔP @ 2 m/s mm H₂O | Increase in Scrim ΔP % | Residue L,M,H | Peel g/25 mm |
|---|---|---|---|---|---|---|---|---|---|---|---|
| S-1 | 18.4 | 24.9 | 6.5 | 1694 | 1618 | −76 | 0.23 | 0.24 | 4 | L | 71 |
| S-2 | 41.5 | 54.3 | 12.8 | 1456 | 1147 | −309 | 0.54 | 0.73 | 35 | M | 63 |
| S-3 | 18.9 | 24.1 | 5.2 | 2022 | 2006 | −16 | 0.06 | 0.07 | 17 | M/H | 51 |
| S-4 | 21.8 | 25.0 | 3.2 | 2029 | 2014 | −15 | 0.06 | 0.06 | 0 | L | 45 |
| S-5 | 6.0 | 9.0 | 3.0 | 2113 | 2105 | −8 | | | | L | 40 |
| S-6 | 23.2 | 31.7 | 8.5 | 1990 | 1983 | −7 | | | | L | 45 |
| S-7 | 10.6 | 15.4 | 4.8 | 2150 | 2106 | −44 | 0.06 | 0.07 | 17 | L | 53 |
| S-8 | 14.0 | 22.9 | 8.9 | 1334 | 749 | −585 | | | | | 5 |
| S-9 | 67.4 | 110.5 | 43.1 | 546 | 45 | −501 | 7.58 | >150 | >1849 | L | |
| S-10 | 8.4 | 15.4 | 7.0 | 1456 | 1077 | −379 | 0.85 | 3.21 | 278 | L | 9 |
| S-12 | 90.3 | 118.6 | 28.3 | | | | 0.23 | 2.41 | 948 | M | |

Example 5

Adhesives A-1 through A-6 were coated on to scrim S-1 using the bench-top coating method described above. Adhesive A-3 gave higher ΔP because of some bridging. Also, higher peel strength was observed. Both of these effects are probably due to the slightly higher coating weight.

TABLE 7

Performance of Scrim Coated with Various Adhesives

| Adhe-sive | Adhesive wt g/m$^2$ | Uncoated Scrim ΔP @ 2 m/s mm H$_2$O | Coated Scrim ΔP @ 2 m/s Mm H$_2$O | Increase in Scrim ΔP % | Average Peel Strength g/25 mm | Peel after 24 hrs @ 70° C. g/25 mm |
|---|---|---|---|---|---|---|
| A-1 | 6.3 | 0.23 | 0.23 | 0% | 86 | 67 |
| A-2 | 4.6 | 0.23 | 0.24 | 4% | 60 | 69 |
| A-3 | 9.0 | 0.23 | 0.27 | 17% | 121 | 150 |
| A-4 | 5.3 | 0.23 | 0.23 | 0% | 59 | 63 |
| A-5 | 6.1 | 0.23 | 0.26 | 13% | 116 | 65 |
| A-6 | 1.4 | 0.23 | 0.26 | 13% | 1* | 0 |

*This natural rubber adhesive was initially tacky, but lost tack within 6 hrs of coating. Testing was conducted 24 hours after coating. Aging tests at 70° C. were conducted because of this observation. After oven aging, the acrylate adhesives were not significantly affected, but the rubber-based adhesives lost peel performance.

Example 6

Adhesive A-2 was coated on scrim S-1 and the adhesive coated scrim laminated to several nonwovens. The thus produced laminates were evaluated according to previously described test methods for pressure drop, filtration efficiency, and Frazier permeability. The nonwovens were also qualitatively rated for their adhesion to the PSA scrim.

Pressure drop of adhesive A-2 coated on scrim S-1 was tested to be 0.23 mm H$_2$O at 2 meters/second (m/s).

TABLE 8

Performance Characteristics of Filter member Laminated to Adhesive Coated Scrim

| Filter member | Basis Wt. g/m$^2$ | Thickness mm | NaCl Efficiency @ 1 m/s % | Filter member ΔP @ 2 m/s mm H$_2$O | SCRIM & Filter member ΔP @ 2 m/s mm H$_2$O | Increase in Filter member ΔP % | Gradience G$_{AP}$ mm H$_2$O | Frazier Permeability (filter member) cfm | Frazier Permeability (Filter member & scrim) cfm | Change in Frazier Permeability due to scrim S-1 cfm | Adhesion to PSA Scrim |
|---|---|---|---|---|---|---|---|---|---|---|---|
| F-1 | 55.1 | 0.70 | 2 | 1.8 | 2.2 | 22 | 0.72 | 1225 | 1019 | −206 | M |
| F-2 | 18.1 | 0.14 | 6 | 3.0 | 3.8 | 27 | 0.73 | 947 | 647 | −300 | M-H |
| F-3 | 50.6 | 0.55 | 29 | 4.8 | 5.4 | 13 | 0.86 | 601 | 575 | −26 | H |
| F-5 | 36.5 | 0.44 | 29 | 5.0 | 5.7 | 14 | 0.83 | 977 | 582 | −395 | H |
| F-6 | 51.4 | 0.82 | 40 | 6.1 | 6.8 | 11 | 0.87 | 583 | 517 | −66 | H |
| F-7 | 68.4 | 0.62 | 41 | 6.6 | 7.2 | 9 | 0.89 | 647 | 576 | −71 | M-H |
| F-8 | 70.1 | 0.27 | 3 | 8.8 | 10.5 | 19 | 0.81 | 409 | 391 | −18 | M |
| F-9 | 66.4 | 0.80 | 20 | 8.5 | 8.9 | 5 | 0.92 | 533 | 522 | −11 | L |
| F-10 | 44.3 | 0.19 | 9 | 8.4 | 10.1 | 20 | 0.81 | 616 | 469 | −147 | M-H |
| F-11 | 52.2 | 0.26 | 16 | 12.4 | 13.6 | 10 | 0.89 | 453 | 420 | −33 | L |
| F-12 | 66.9 | 0.52 | 58 | 54.4 | 58.1 | 7% | 0.93 | 136 | 120 | −16 | M |
| F-13 | 20.5 | 0.14 | 88 | 77.7 | 90.8 | 17% | 0.85 | 69 | 66 | −3 | H |
| F-14 | 66.5 | 0.45 | 90 | 102.5 | 108.3 | 6% | 0.94 | 65 | 62 | −3 | M |
| F-15 | 230.4 | 1.26 | 9.9 | 8.4 | 8.9 | 5% | 0.93 | 520 | 503 | −17 | M |

Example 7

Adhesive A-2 was coated on S-2 according to the Bench Top method outlined above. This adhesive scrim was laminated to three nonwovens.

The data showed that this scrim gave a larger increase in pressure drop and a lower "gradience."

TABLE 9

Performance characteristics of three filter member laminated to a higher pressure drop scrim

| Filter member | Basis Wt. g/m² | Thickness mm | NaCl Efficiency % | Filter member ΔP @ 2 m/s mm H₂O | Scrim ΔP @ 2 m/s mm H₂O | SCRIM & Filter member ΔP @ 2 m/s mm H₂O | Increase in ΔP % |
|---|---|---|---|---|---|---|---|
| F-1 | 55.1 | 0.7 | 1.5 | 1.61 | 0.74 | 2.64 | 64 |
| F-3 | 50.6 | 0.55 | 29.2 | 4.92 | 1.22 | 7.18 | 46 |
| F-9 | 66.4 | 0.8 | 20 | 8.8 | 1.54 | 11.49 | 31 |

| Filter member | Gradience mm H₂O | Frazier Permeability (filter member) cfm | Frazier Permeability (SCRIM) cfm | Frazier Permeability (Filter member & SCRIM) cfm | Change in Frazier Permeability cfm | Adhesion to PSA SCRIM |
|---|---|---|---|---|---|---|
| F-1 | 0.33 | 1225 | 1225 | 1160 | −65 | M |
| F-3 | 0.52 | 707 | 1091 | 515 | −192 | H |
| F-9 | 0.63 | 468 | 923 | 379 | −89 | L |

Comparative Example

Filter members F-1, F-3, and F-13 were coated with adhesive A-7 according to the following procedure: 170 mm×170 mm filter member samples were tested for initial basis weight, NaCl penetration, and pressure drop according to the test methods outlined above. Duro All-Purpose 81088 pressure sensitive adhesive (available from Loctite Corporation, Rocky Hill, Conn.) was then evenly spray applied to one side of the filter member for approximately four seconds. The adhesive was then "vacuumed into the fibers" by placing filter member into a 170 mm×170 mm frame attached to the intake of a standard, commercially available canister-type vacuum cleaner and a vacuum applied to the filter member for approximately 30 seconds. A second coat of adhesive was subsequently evenly spray applied onto the previously adhesive coated side of the filter member for about four seconds. Testing of the coated filter member included the above tests as well as a test for residue as outlined in the test methods section.

The spray adhesive increased the pressure drop on all samples, the most significant increase was with the high pressure drop filter member (F-13). The spray adhesive also decreased efficiency of the electret filter member (F-3) significantly. Residues on all samples were poor.

Various modifications and alterations of this invention will become apparent to those skilled in the art without departing from the scope and principles of this invention, and it should be understood that this invention is not to be unduly limited to the illustrative embodiments set forth hereinabove. All publications and patents are incorporated herein by reference to the same extent as if each individual publication or patent was specifically and individually indicated to be incorporated by reference.

What is claimed:

1. A filter assembly comprising:
   a porous filter member; and a pressure sensitive adhesive disposed on a reinforcement scrim adhesively attached to at least a portion of at least one major surface of the porous filter member with the same pressure sensitive adhesive, wherein the reinforcement scrim has discrete open areas.

2. The filter assembly of claim 1 wherein the reinforcement scrim discrete open areas have an average effective circular diameter of at least about 300 microns.

3. The filter assembly of claim 1 wherein the reinforcement scrim is formed from a thermoplastic polymer or fiberglass.

4. The filter assembly of claim 1 wherein the filter member comprises a fibrous nonwoven web, a foam, or a porous membrane.

5. The filter assembly of claim 4 wherein the filter member comprises a fibrous nonwoven web.

6. The filter assembly of claim 1 wherein the filter member comprises electret fibers.

TABLE 10

Comparative Example of Aerosol Adhesive Sprayed on Various Filter member

| Filter member | Uncoated Filter member Basis Weight G/m² | Basis Weight of Adhesive Coating g/m² | Uncoated Filter member Pressure Drop mm H₂O | Coated Filter member Pressure Drop mm H₂O | Change in Pressure Drop % | Uncoated Filter member Efficiency % | Coated Filter member Efficiency % | Change in Efficiency due to Adhesive % | Residue (L,M,H) |
|---|---|---|---|---|---|---|---|---|---|
| F-1 | 53.4 | 9.7 | 1.8 | 2.0 | 13% | 5.6 | 5.4 | −4% | H |
| F-1 | 49.2 | 11.6 | 1.6 | 1.8 | 14% | 2.1 | 4.4 | 110% | H* |
| F-1 | 52.3 | 13.0 | 1.7 | 1.9 | 10% | 4.4 | 3.6 | −18% | H* |
| F-3 | 50.6 | 15.6 | 5.3 | 5.8 | 11% | 33.5 | 22.1 | −34% | H* |
| F-3 | 46.2 | 12.7 | 4.5 | 5.1 | 13% | 27.6 | 21.2 | −23% | H* |
| F-3 | 45.9 | 14.1 | 4.5 | 4.7 | 4% | 27.5 | 15.2 | −45% | H* |
| F-13 | 20.5 | 15.5 | 74.8 | 120.3 | 61% | 94.0 | 97.9 | 4% | H* |
| F-13 | 20.6 | 14.3 | 77.5 | 188.4 | 143% | 84.5 | 96.0 | 14% | H* |

*Peeling from poly film destroyed filter member (due to excessive adhesion/residue).

7. The filter assembly of claim 6 wherein the electret fibers comprise a polyolefin.

8. The filter assembly of claim 7 wherein the polyolefin is a polypropylene.

9. The filter assembly of claim 6 wherein the filter member comprises an electret split fiber web, an electret spunbond web, an electret tribocharged web, or an electret melt blown web.

10. The filter assembly of claim 9 wherein the filter member comprises an electret split fiber web.

11. The filter assembly of claim 1 wherein the pressure sensitive adhesive comprises a (meth)acrylic-based adhesive, poly(alpha-olefin)-based adhesive, synthetic rubber-based adhesive, or a silicone-based adhesive.

12. The filter assembly of claim 11 wherein the pressure sensitive adhesive comprises a (meth)acrylic-based adhesive.

13. The filter assembly of claim 1 wherein the scrim is adhesively attached to the entire surface of at least one major surface of the porous filter member.

14. The filter assembly of claim 1 wherein the scrim is adhesively attached to discrete regions of at least one major surface of the porous filter member.

15. The filter assembly of claim 14 wherein the scrim is adhesively attached to the periphery of at least one major surface of the porous filter member.

16. The filter assembly of claim 1 wherein the filter member comprises absorptive or adsorptive particles.

17. A filter assembly comprising:
a porous filter member comprising fibrous filter media; and a pressure sensitive adhesive impregnated into discrete regions of the porous filter member such that there is a substantially continuous adhesive region throughout at least about 25% of the thickness of the porous filter member in the discrete regions.

18. The filter assembly of claim 17 wherein the filter member comprises a fibrous nonwoven web.

19. The filter assembly of claim 17 wherein the filter member comprises electret fibers.

20. The filter assembly of claim 19 wherein the electret fibers comprise a polyolefin.

21. The filter assembly of claim 20 wherein the polyolefin is a polypropylene.

22. The filter assembly of claim 19 wherein the filter member comprises an electret split fiber web, an electret spunbond web, an electret tribocharged web, or an electret melt blown web.

23. The filter assembly of claim 22 wherein the filter member comprises an electret split fiber web.

24. The filter assembly of claim 17 wherein the pressure sensitive adhesive comprises a (meth)acrylic-based adhesive, poly(alpha-olefin)-based adhesive, synthetic rubber-based adhesive, or a silicone-based adhesive.

25. The filter assembly of claim 24 wherein the pressure sensitive adhesive comprises a (meth)acrylic-based adhesive.

26. The filter assembly of claim 17 further comprising a release liner disposed on the adhesive.

27. The filter assembly of claim 26 wherein the release liner forms a finger-lift tab.

28. A filter assembly comprising:
a porous filter member; and
a pressure sensitive adhesive disposed on a reinforcement scrim adhesively attached to the periphery of at least one major surface of the porous filter member with the same pressure sensitive adhesive, wherein the reinforcement scrim has discrete open areas;
wherein the pressure sensitive adhesive comprises a (meth)acrylic-based adhesive.

29. A filter assembly comprising:
a porous filter member comprising fibrous filter media; and
a pressure sensitive adhesive impregnated into discrete regions of the porous filter member such that there is a substantially continuous adhesive region throughout at least about 25% of the thickness of the porous filter member in the discrete regions;
wherein the filter member comprises electret fibers; and
further wherein the pressure sensitive adhesive comprises a (meth)acrylic-based adhesive.

* * * * *